(12) United States Patent
Gokhale et al.

(10) Patent No.: US 11,115,419 B2
(45) Date of Patent: Sep. 7, 2021

(54) IDENTITY ATTRIBUTE CONFIDENCE SCORING WHILE CERTIFYING AUTHORIZATION CLAIMS

(71) Applicant: International Business Machines Corporation, Armonk, NY (US)

(72) Inventors: Parag Gokhale, Pune (IN); Sakshi Malik, Pune (IN); Shlok Sanjay Gilda, Vadodara (IN); Shams Hasan Rizvi, Thane (IN); Rohan Poulose, Pune (IN)

(73) Assignee: International Business Machines Corporation, Armonk, NY (US)

( * ) Notice: Subject to any disclaimer, the term of this patent is extended or adjusted under 35 U.S.C. 154(b) by 131 days.

(21) Appl. No.: 16/377,168

(22) Filed: Apr. 6, 2019

(65) Prior Publication Data

US 2020/0322342 A1   Oct. 8, 2020

(51) Int. Cl.
*G06F 21/00* (2013.01)
*H04L 29/06* (2006.01)

(52) U.S. Cl.
CPC .......... *H04L 63/102* (2013.01); *H04L 63/108* (2013.01)

(58) Field of Classification Search
CPC .. G06F 21/6245; G06F 21/6218; G06F 21/41; G06F 21/10; G06F 21/604; H04L 63/102; H04L 63/108
See application file for complete search history.

(56) References Cited

U.S. PATENT DOCUMENTS

| | | | |
|---|---|---|---|
| 9,722,991 B2 | 8/2017 | Canning et al. | |
| 9,805,213 B1* | 10/2017 | Kragh | H04L 63/0861 |
| 9,882,887 B2 | 1/2018 | Rykowski et al. | |
| 2014/0282893 A1 | 9/2014 | Sheller et al. | |
| 2017/0118218 A1* | 4/2017 | Koottayi | H04L 63/101 |

(Continued)

FOREIGN PATENT DOCUMENTS

WO   2017105626 A1   6/2017

OTHER PUBLICATIONS

NIST, "Attribute metadata and confidence scoring," Information Technology Laboratory, NIST, Version: 1, Dec. 16, 2015.

(Continued)

*Primary Examiner* — Ghazal B Shehni
(74) *Attorney, Agent, or Firm* — Jeffrey S. LaBaw; David H. Judson (57) ABSTRACT

An identity management system is augmented to compute a time-varying confidence score for an asserted attribute value, typically a value that is received from a third party identity issuer. In this approach, an identity provider (IdP) computes a time-varying confidence score for an asserted attribute that the IdP includes in a security assertion returned to a service provider. The confidence score typically is "deteriorating" (i.e., diminishes over time) for an attribute value. The degree to which the score deteriorates, however, may be altered by one or more qualified attribute verification event(s). Preferably, the IdP maintains a profile of the service provider, and that profile may also include other information, such as a threshold for an attribute confidence score that the SP deems acceptable (to enable access to the service). Based on the SP profiling, the IdP also can recommend use of a given identity issuer for a specific attribute.

21 Claims, 7 Drawing Sheets

(56) References Cited

U.S. PATENT DOCUMENTS

2017/0171195 A1* 6/2017 Chang .............. G06Q 20/40145
2017/0195415 A1* 7/2017 Versteeg ............... H04L 67/306

OTHER PUBLICATIONS

Grassi, et al, "Attribute metadata, a proposed schema for evaluating federated attributes," NISTIR 8112, Jan. 2018.
Li et al, "Linking temporal records," Proceedings of the VLDB Endowment, vol. 4, No. 11, Aug. 2011.

* cited by examiner

| ATTRIBUTE | PROBABLITY OF CHANGE |
|---|---|
| FORENAME | 0.1% / MONTH |
| DoB | 0 |
| ADDRESS | 0.5% / MONTH |

FOR AN IDENTITY:

| CUSTOMER ID | ATTRIBUTE | DATE OF ATTRIBUTE VALIDATION/ REVALIDATION | DATE OF ATTRIBUTE ASSERTION |
|---|---|---|---|
| CUST 1 | FORNAME | JANUARY 1, 2018 | MAY 15, 2018 |
| CUST 2 | DoB | JANUARY 15, 2018 | DECEMBER 31, 2028 |
| CUST 1 | ADDRESS | MARCH 15, 2018 | MARCH 15, 2018 |

| IDI REFERENCE | ATTRIBUTE COVERED | VERIFIED | STARTING CONFIDENCE SCORE |
|---|---|---|---|
| PASSPORT AUTHORITY | DoB | YES | 1.0 |
| PASSPORT AUTHORITY | EMAIL | NO | 0.5 |
| GOOGLE | DoB | NO | 0.5 |

FIG. 10

EXAMPLE:

| IDI | SUPPORTED ATTRIBUTE | ORIGINAL ATTRIBUTE VALIDATION PROCESS CONFIDENCE SCORE | ADVERSE EVENT(S) |
|---|---|---|---|
| PASSPORT AUTHORITY | ADDRESS | 1.0 | NONE |
| THE GAMBLERS' CLUB | CREDIT CARD | 1.0 | DATA POSSIBLY CHANGED IN AN INCIDENT CURRENTLY UNDER INVESTIGATION |

| IDI | USER IDENTIFIER(S) | ATTRIBUTE | VALIDATION DATE |
|---|---|---|---|
| PASSPORT AUTHORITY | U100X50BC91 | ADDRESS | JANUARY 1, 2018 |
| THE GAMBLERS' CLUB | U100X50BC91 | CREDIT CARD | SEPTEMBER 28, 2017 |

| SP | ATTRIBUTE NAME | LAST KNOWN ACCEPTABLE THRESHOLD CONFIDENCE VALUE |
|---|---|---|
| WWW.SIM-TO-GO.BIZ | ADDRESS | 0.75 |
| WWW.SIM-TO-GO.BIZ | CREDIT CARD | 1.0 |

IDENTITY ATTRIBUTE CONFIDENCE SCORING WHILE CERTIFYING AUTHORIZATION CLAIMS

BACKGROUND

Technical Field

This disclosure relates generally to the field of digital resource access, and more particularly to risk-based computer recertification of online access.

Background of the Related Art

Identity and Access Management Governance is a set of processes and policies for organizations to manage risks and maintain compliance with regulations and policies by administering, securing, and monitoring identities and their access to applications, information, and systems. Although potentially complex in implementation, the concept of Identity and Access Management (IAM) Governance is fairly straightforward: determine who should have access to what resources and who should not, according to government regulations, industry-specific regulations (SOX, HIPPA, GLBA, etc.), and business regulations and guidelines. Typically, key aspects of IAM Governance include access request governance, entitlement certifications, reports and audits, and analytics and intelligence (including role management, entitlement management, separation of duties enforcement, and privileged identity management). An end-to-end IAM Governance solution may also provide related functions, such as access enforcement, user provisioning, password management, and user lifecycle management.

Identity and access management (IAM) systems protect enterprise data and applications with context-based access control, security policy enforcement and business-driven identity governance. These systems may be operated in a standalone manner, in association with cloud-based environments, or in hybrid environments.

Traditional Identity Management solutions of this type enable enterprises (businesses) to manage employee identities. Typically, employee authentication and authorization to various applications within the enterprise is managed with a centralized identity repository. In the usual case, the enterprise completely owns and controls the management of these identities, and thus attribute values for an identity are vetted at the time of identity creation, modification, or deletion. In this manner, the enterprise can have highest confidence while asserting an employee's attribute (e.g., birthdate) to an internal system (e.g., a Human Resource Management System (HRMS), when the employee takes an action, such as an attempt to log into such a solution.

In addition, known customer Identity Management solutions also provide for social media-based authentication. For example, a consumer taking an action on a given site (e.g., renting a video from an on-line store) may do so using his or her social media credential (e.g., from Google®, Facebook®, Twitter®, etc.). This is known as federated authentication, and the notion is based on the trust the given site affords the social media sites, even though in the usual case the given site (in this case, the on-line video store) does not have any basis to trust the particular identity attributes that were originally ascertained by the social media sites. As an example, during the above-described social media-based authentication, the video rental site may expect the user's birthdate to be asserted, e.g., so that it can determine whether particular age-appropriate content should or should not be available to the consumer. Typically, however, the social media sites on whom the user's authentication is based do not verify or validate the user's birthdate in the first instance, thus in the usual case the probability of the social media asserting the user's birthdate correctly is 50%. On the other hand, some iGoverment Services (e.g., National ID) verify and validates a person's birth date; when those types of identity system assert a user's birth date, the probability that the user's birth date is accurate then may be close to 100%.

Multiple regulatory and industry standards bodies are working on creating a framework by which identity attribute values also include a validation or confidence score. Two prominent ones are NIST proposal titled "Attribute Metadata: A Proposed Schema for Evaluating Federated Attributes," and a W3C Working Group for "Verifiable Claims."

There remains a need to provide efficient and scalable techniques by which such confidence scores are computed and utilized within an identity management solution.

BRIEF SUMMARY

According to this disclosure, an identity management system is augmented to provide a technique to compute a time-varying confidence score for an asserted attribute value, typically a value that is received by the system from a third party identity issuer. A representative use case occurs during an authentication flow initiated by a customer/user (an "entity") requesting access to a service from a service provider (SP), wherein the SP relies on an associated identity provider (IdP) to carry out the user authentication. According to the technique herein, the identity provider (IdP) is configured with a mechanism to compute time-varying confidence score for an asserted attribute that the IdP includes in a security assertion (e.g., a token) that the IdP returns to the SP and that the SP uses to make a decision to authorize the requested access. In one embodiment, the mechanism is implemented as a confidence scoring engine that creates and manages a confidence score that, for an attribute value for the entity, diminishes over time. According to another aspect, the degree to which a score such as this deteriorates, however, may be altered, e.g., arrested completely and reset to an initial value by one or more qualified attribute verification event(s) that are determined by the IdP to have occurred. One such event is a determination by the IdP that the customer recently used the same attribute claim for the same SP. Such information may be maintained by the IdP in a profile of the service provider, and that profile may also include other information about the SP, such a threshold for an attribute confidence score that the SP deems acceptable (to enable access to the service). Based on the SP profiling, the IdP also can recommend use of a given identity issuer for a specific attribute.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
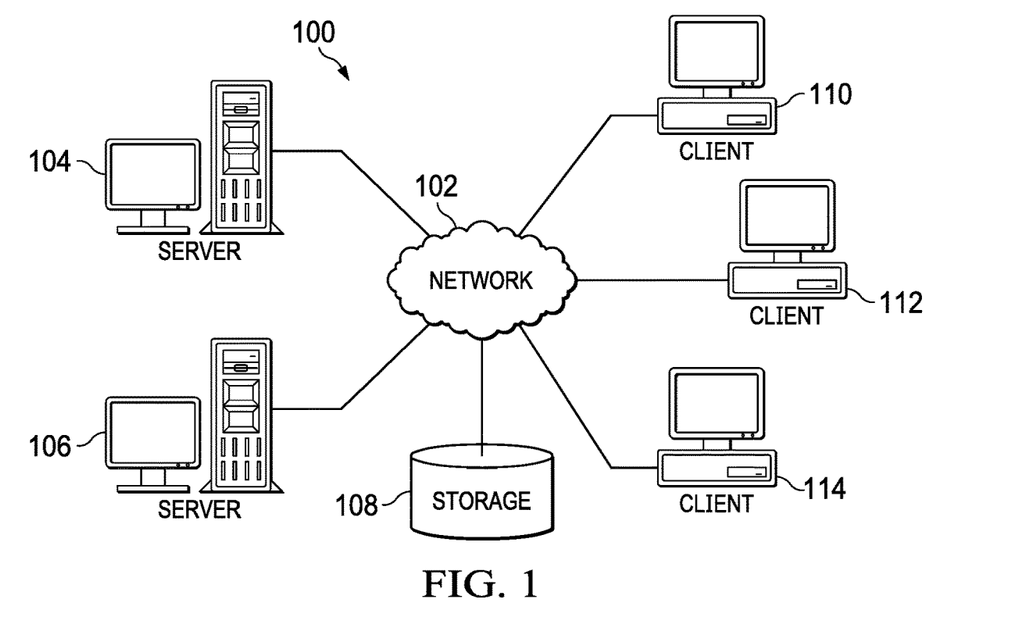
FIG. 1 depicts an exemplary block diagram of a distributed data processing environment in which exemplary aspects of the illustrative embodiments may be implemented.
Figure 2:
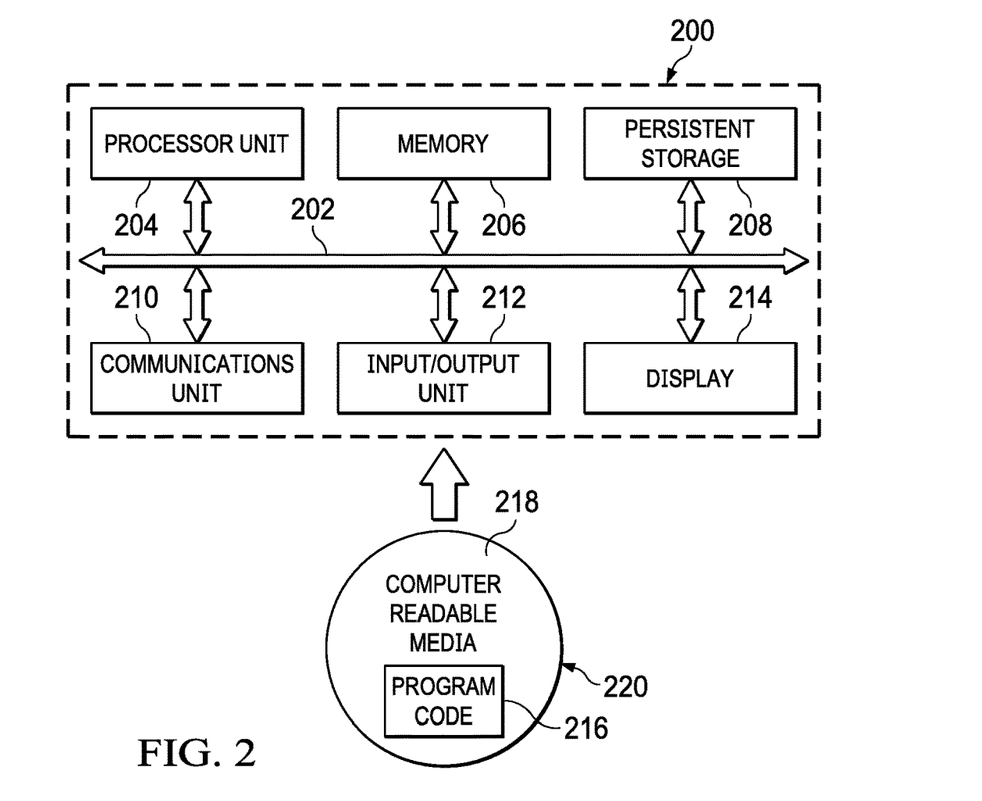
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Identity and Access Management

In an IAM system, an "account" typically refers to an entity that contains a set of parameters that define application-specific attributes of a principal, which include the identity, user profile, and credentials. A "credential" refers to a declaration of authorization or other security attributes of a subject that is typically validated and signed by a trusted third party. Typically, a credential represents the ID and authenticators (such as a password) for a resource. An "identity" refers to a subset of profile data that uniquely represents a person or entity and that is stored in one or more repositories. A "principal" is a person or group that has been granted permissions. It also refers to an entity that can communicate securely with another entity. A "resource" is a hardware, software, or data entity. A "service" is a representation of a managed resource, application, database, or system. In an identity management system, typically a service represents the user repository for a managed resource. A "user" is an individual, organization, process, device, program, protocol, or system that uses the services of a computing system. For example, a user is an individual who uses the identity management system to manage their accounts and passwords, or that is managed by the system.

For many applications, networks, databases and other resources, users are given "access" by an authority or administrative role to enable activity associated with the resource. The conditions and limitations of the access for a given user are referred to as the "access entitlement" for the user, and include defined limitations as to the activities the user may perform with or on the resource. Access entitlements among users of the same resource can vary. For instance, a database administrator may have access and authority to read, write, edit, search, copy, delete and transfer data for a specific database, whereas others with access to the database may be limited to searching and reading data.

Identity management (IdM) is an administrative area that utilizes a system to identify individuals with membership or association, such as with a group, organization, company, etc. Additionally, an IdM system controls the individual's access to resources by use of restrictions or permissions. To facilitate better decisions for granting appropriate access, information regarding a user's request for access, their job role, and whether the access is a new request or renewal is considered, however, this limited information can prove ineffective in preventing high risk situations.

Control and oversight of resource access approval of individuals in business or enterprise organizations are further challenged by the turnover of personnel, the dynamic day-to-day changes and organizational restructuring, as well as application version upgrades. In large organizations, granting users the appropriate access entitlements to resources and maintaining access entitlements is a difficult task that can involve thousands of users and hundreds of resources. Resource access decisions and compliance verification responsibilities are typically allocated to supervisors or managers, who have few tools to facilitate decisions or identify risks and due to time constraints, often provide access in the belief that the individuals' performance will improve or not be impacted.

It is known in the prior art to provide software and services to deploy policy-based provisioning solutions. These solutions help companies automate the process of provisioning employees, contractors, and business partners with access rights to the applications they need, whether in a closed enterprise environment or across a virtual or extended enterprise. A known product of this type is IBM® Security Identity Manager.

Figure 3:
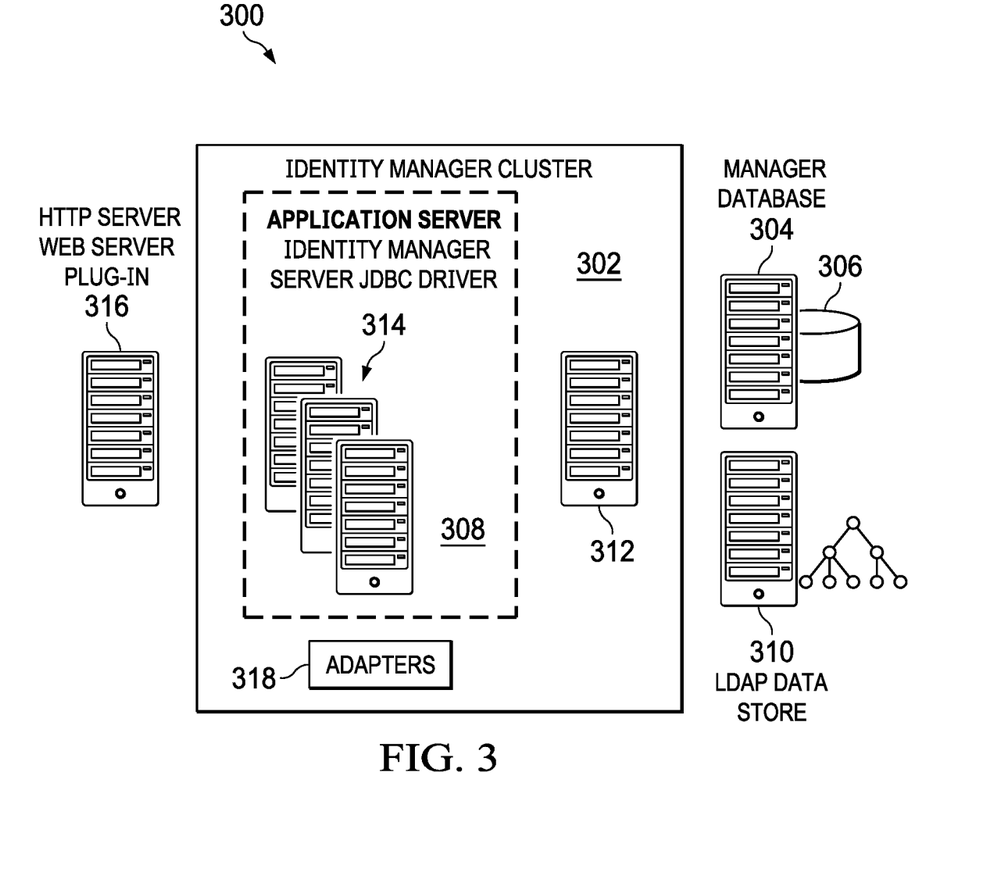
FIG. 3 is a representative security identity management system in which the disclosed subject matter may be implemented.

FIG. 3 is a block diagram of this commercially-available identity manager solution. In one embodiment, as will be described, the techniques of this disclosure may be implemented in such a solution. This identity manager solution, however, is merely representative and should not be taken to limit this disclosure. The representative commercial implementation is known as IBM® Security Identity Manager, Version 6.0; other solutions of this general type include IBM Tivoli Federated Identity Manager (TFIM). These types of solution manage the identity records that represent people in a business organization. In particular, the product is an identity management solution that centralizes the process of provisioning records, such as provisioning accounts on operating systems, applications, etc., to users. Among other features, the product affords an organization the ability to add business processes and security policies to basic user management. The solution also affords the ability to add approvals for user requests to access requests. In general, the solution provides a uniform way to manage user accounts and to delegate administration, including self-service and a help desk user interface.

As illustrated in FIG. 3, the main components of the IBM® Security Identity Manager solution 300 include IBM Security Identity Manager Server 302 and required and optional middleware components, including adapters that provide an interface to managed resources. In a cluster configuration as illustrated, the components include a database server 304 that stores transactional and historical data, and a relational database 306 that maintains current and historical states of data. Computers that communicate with the database typically require a Java™ Database Connectivity driver (JDBC driver) 308. For example, a JDBC driver enables an IBM Security Identity Manager Server to communicate with a data source. IBM Security Identity Manager supports a JDBC type 4 driver to connect a Java-based application to a database. The supported database products are IBM DB2® Database, Oracle DB, and MS SQL Server database. As also seen in FIG. 3, the solution also includes a directory server 310 to store a current state of the managed identities (including user account and organizational data) in an LDAP (or equivalent) directory. Thus, for example, IBM Security Identity Manager supports the following products: IBM Tivoli® Directory Server, and Sun Enterprise Directory Server. The solution also preferably includes a directory integrator 312, such as IBM Tivoli Directory Integrator, to synchronize identity data in different directories, databases, and applications. IBM Tivoli Directory Integrator synchronizes or manages information exchanges between applications or directory sources. The solution also includes one or more application servers 314, such as IBM WebSphere® Application Server. WebSphere Application Server runs a Java virtual machine (JVM) that provides a runtime environment for the application code. The application server provides communication security, logging, messaging, and Web services. As also seen in FIG. 3, typically the configuration includes one or more WebSphere Application Servers and a deployment manager that manages the cluster. The solution also typically includes an HTTP server and WebSphere Web Server plug-in 316. An HTTP server provides administration of IBM Security Identity Manager through a client interface in a web browser. Finally, the solution typically includes one or more IBM Security Identity Manager adapters 318. An adapter is a program that provides an interface between a managed resource and the IBM Security Identity Manager Server. Adapters function as trusted virtual administrators on the target platform for account management. For example, adapters do such tasks as creating accounts, suspending accounts, and modifying account attributes. An IBM Security Identity Manager adapter can be either agent-based or agentless. An agent-based adapter is one wherein the user installs adapter code directly onto the managed resource with which it is designed to communicate. An agentless adapter is deployed onto the IBM Security Identity Manager Server and the system that hosts IBM Tivoli Directory Integrator. In this case, the adapter code is separate from the managed resource with which it is designed to communicate.

As noted above, the implementation shown in FIG. 3 is not intended to be limiting but, rather, merely illustrates one possible operating environment; other commercial or proprietary implementations may include similar components and functionalities.

Each of the machines shown in FIG. 3 may be implemented using the machine architecture shown in FIG. 2; the various machines may interact with one another as illustrated in FIG. 1.

The security identity management solution of this type also may be implemented in whole or in part in a cloud-based solution.

Federated Authentication

Figure 4:
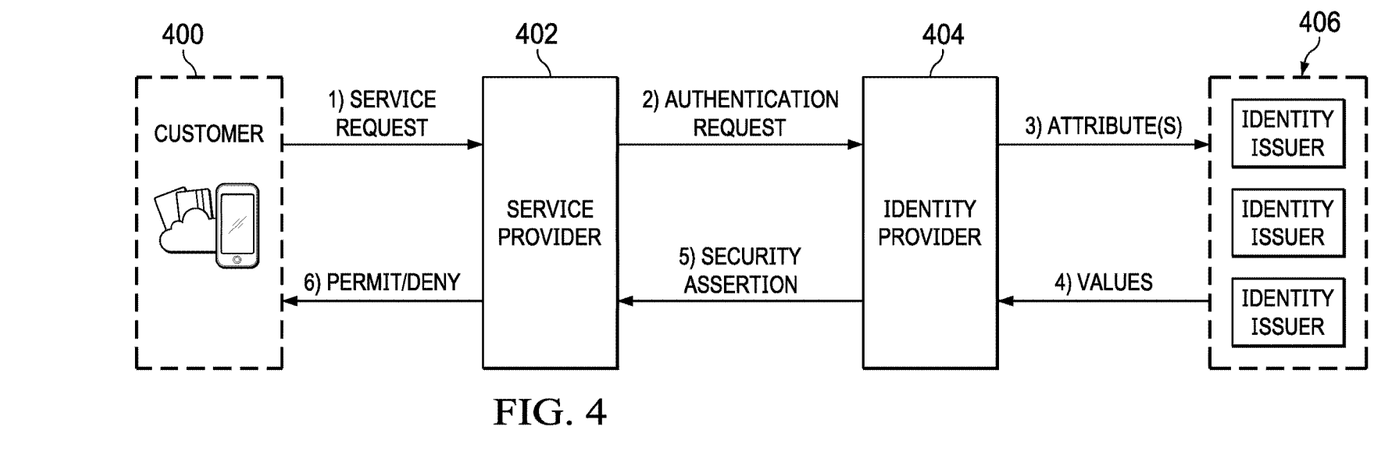
FIG. 4 depicts an authentication token-based process flow in which the techniques of this disclosure may be implemented.

FIG. 4 depicts a known federated authentication (e.g. SAML or OIDC) flow involving a service provider (SP) reaching out to an identity provider (IdP) for an authorization. This known authentication scheme provides for the IdP returning to the SP a security assertion (e.g., a token) that is augmented to include a confidence score for a particular attribute.

FIG. 4 depicts the conventional single sign-on (SSO) flow for a customer 400 attempting to sign-in to a service provider 402. As used herein, the customer is sometimes referred to as the "user" or, more generally, the requesting "entity." At step (1), the customer (via a client browser, mobile app or the like) 400 attempts to access a protected resource (i.e., one whose access requires authentication) from service provider 402. At step (2), the service provider 402 contacts the identity provider (IdP) 404 to authenticate the customer. To this end, the SP 402 may request a few special identity-based "claims," such as the user's birth date, credit card details, address, etc. At step (3), the IdP 404 authenticates the customer, e.g. by contacting one or more Identity Issuers (IdI) 406 pre-registered by the customer. Typically, IdIs 406 are one of more of: social media sites, an identity (e.g., National ID) service, a passport service, a driver's license service, or the like. It is assumed that these IdIs provide enable real-time fetching of required attribute values for the customer but only after appropriate security checks have been cleared. Preferably, the IdP 404 itself does not hold any of the customer attributes. Its role is to authenticate the customer in a known manner (e.g., password, PIN, biometric, step-up authentication, and the like), create a security assertion (token), add the requested attribute value(s) received from the IdI(s) (step (4)) as claims, and send the resulting security token back to the requesting SP 402 (step (5)). According to the techniques herein, which are described in detail below, a component of at least one claim in the security token includes a confidence score that is computed based on various factors. The SP 402 then authorizes the customer access to the protected resource based on the asserted claim and the confidence score returned from the IdP (step (6)).

By way of additional background, typically an identity is defined by one or more attributes. When an IdI registers or generates an identity for a customer (e.g., a citizen, or visitor, etc.), it may do thorough validation of every single attribute, or it may rely only on specific attribute(s), such as name, address, date of birth. Often, the single most important attribute is an email address, and a validation associated therewith might be restricted only by ensuring that the customer truly is in the owner of that email address. Most email providers allow generation of an email address for a customer without validating any attributes; as a consequence, and using such an email address, the customer can produce other facets of his or her digital identity that are entirely fictitious. Typically, a category of IdIs that verify every single attribute before creating or assigning an identity or identity facet, are generally government organizations, such as a passport office, a vehicle registration department, banks and insurance companies, etc., as they can ascertain/verify one or more of customer's native attributes (such as name, address, date of birth, etc.), as well as one or more "acquired" attributes (such as address, email address, and the like). In contrast, a category of IdIs that verify only a few attributes before creating or assigning an identity or identity facet are generally service providers, such as mobile service provider, a utility provider, etc., which typically rely on just one or more acquired attributes. Finally, a category of IdIs that do not verify any of a customer's attributes before creating or assigning an identity or identity facet typically are those that can only ascertain the identity facet it has created or assigned. For example, an email provider can ascertain an email address with a confidence score of 100%, but its assertion of the customer's name can have a confidence score of only 50%.

While typical customer attributes are surnames or given names, date of birth, address, e-mail address, and the like, such attributes may include other forms, such as relational (e.g., spouse, father, mother, siblings, etc.) and other types, and such attributes may also be associated with a confidence score.

Attribute values collected at the time of generation or assignment of an identity or identity facet, e.g., many collected by government, banking, insurance, etc. entities, do not always remain unchanged until such time that such values are next assessed (e.g., at a renewal). Many such authorities, such as a passport authority, driver's license issuing authority, and the like, do not have means of automatically updating certain attributes unless the customer either requests a change of those attributes or, upon renewal time. In a typical case, a customer changes his or her legal name or address after identity/identity facets are created or assigned, but he or she does not then notify the concerned authorities about the name or address change. This complicates the management of customer identity.

Figure 5:
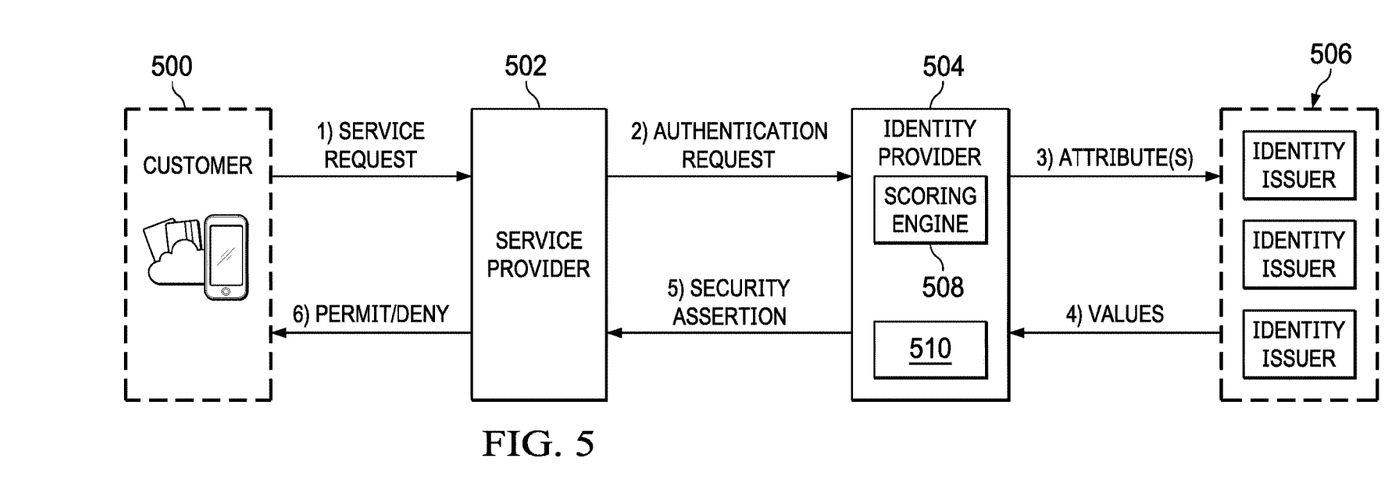
FIG. 5 depicts a federated authentication that includes an identity provider (IdP) configured with a time-varying identity attribute confidence scoring mechanism according to this disclosure.

Computing Identity Attribute Confidence Scoring while Certifying Authorization Claims With the above as background, the subject matter of this disclosure is now described. According to this disclosure, an identity management system is augmented to provide a technique to compute a time-varying confidence score for an asserted attribute value, typically a value that is received by the system from a third party identity issuer. As depicted in FIG. 5, a representative use case occurs during an authentication flow initiated by a customer/user (an "entity") 500 requesting access to a service from a service provider (SP) 502, wherein the SP relies on an associated identity provider (IdP) 504 to carry out the user authentication. As was described with respect to FIG. 4, the IdP 504 relies on one or more identity issuers 506 to provide values of the attributes that the IdP includes in the security assertion the IdP 504 returns to the service provider 502. There may be multiple identity issuers, and each identity issuer may provide values for one or more attributes.

According to the technique herein, the identity provider (IdP) 504 also is configured with a mechanism 508 that the IdP uses to compute a time-varying confidence score for an asserted attribute that the IdP includes in a security assertion (e.g., a token) that the IdP returns to the SP (and that the SP uses to make a decision to authorize the requested access). As will be described, the mechanism 508 is implemented as a confidence scoring that generates and manages a so-called "deteriorating" confidence score (i.e., one that typically diminishes over time) for an attribute value for the entity. As will be described, and according to another aspect, the degree to which a particular attribute score deteriorates, however, may be selectively altered, e.g., arrested completely and reset to an initial value, by what are referred to herein as "qualified attribute verification event(s)" that are determined by the IdP to have occurred (or that the IdP otherwise receives notice about). One such event is a determination by the IdP that the customer recently used the same attribute claim for the same SP. Preferably, this information is maintained by the IdP in a profile 510 of the service provider, and that profile 510 may also include other information about the SP, such a threshold for an attribute confidence score that the SP deems acceptable (to enable access to the service). Based on the SP profiling, the IdP also can recommend use of a given identity issuer for a specific attribute. This recommendation typically is provided by the IdP to the SP, which then passes it on the requesting entity.

In one embodiment, the techniques herein are implemented in a Customer Identity and Access Management (CIAM) system and, in particular, by an Identity Provider (IdP) component of that system. Implementation within or in association with an Identity Provider is not a requirement, however. In an example IdP implementation, the scoring engine and the profiling data are implemented as components of an IAM solution such as IBM® Cloud Identity (CI) services that utilize systems such as IBM Security Access Manager (ISAM) and IBM Tivoli Federated Identity Manager (TFIM). Representative IDIs include, without limitation, Google®, Facebook®, a Government Passport Authority, a State DMV, or the like.

According to one aspect of the disclosure, the notion of a time-varying confidence score is a measure of a probability of an attribute's value changing over time and, as noted above, preferably this score is associated with the value of the attribute that is included in the security assertion returned to the SP by the IdP. In this approach, this measure is referred to as a deteriorating confidence measure. This nomenclature is not intended to be limiting. In an example, a customer (user) has an identity, and that identity comprises a set of attributes, and wherein one or more of such attributes each has a deteriorating confidence measure representing a probability of that attribute's value changing over time. Thus, a set of attributes may be expressed by their attribute/ probability of change measures (e.g., expressed as name/ value pairs): {first name (forename), 0.1%/month; date of birth, 0; address, 0.5%/month; . . . }. Preferably, and as mentioned above, the deteriorating confidence measure for a particular attribute value of an entity may be altered (e.g., arrested from further deterioration) by one or more qualifying events that boost the associated attribute's confidence score. In this manner, and as will be seen, a time-diminishing attribute value may have its value boosted by one or more qualifying event(s). An event of this type is sometimes referred to herein as a qualified attribute verification event.

According to another aspect of this disclosure, preferably an identity provider (IdP) profiles service provider (SP) thresholds for a given attribute's confidence score. In one embodiment, the IdP treats the customer's "last use" for an attribute claim for the SP as a pseudo-verification event, and the existence of the event resets a deteriorating confidence measure accordingly.

According to still another aspect, and based on the SP profiling, the IdP may recommend use of a particular identity issuer (IdI) for a specific attribute.

As described above, and according to this disclosure, an identity management system is augmented (i.e. extended or supplemented) to provide a technique identity attribute confidence scoring while certifying an authorization claim. A representation implementation of this technique may be carried out in with the context of an authentication flow such as shown in FIG. 4, or within the context of an enterprise-based IdM solution such as described in FIG. 3.

Figure 6:
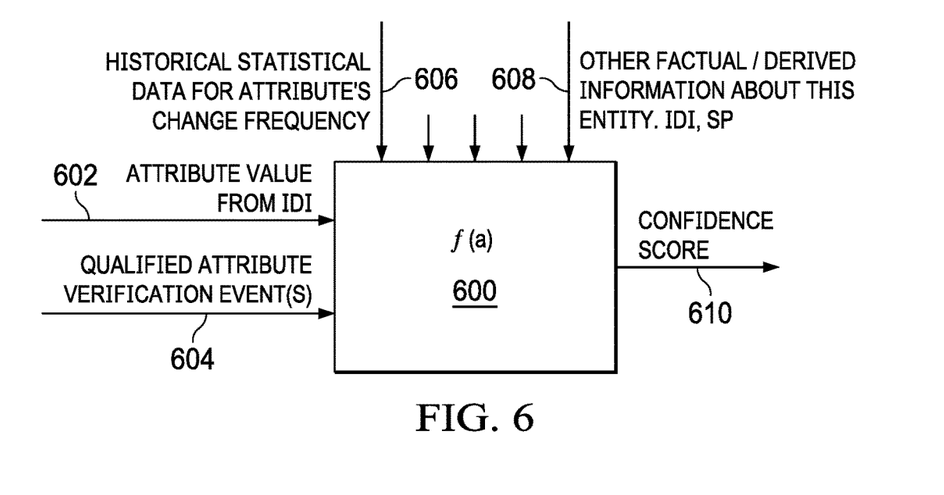
FIG. 6 depicts an identity attribute confidence scoring mechanism according to this disclosure.

FIG. 6 depicts a preferred design of an identity attribute confidence scoring mechanism according to this disclosure. Typically, the scoring mechanism 600 is implemented in software, e.g., a set of computer program instructions or program code elements, that are configured to execute in one or more processors. In the context of a federated scheme such as was depicted in FIG. 4, the mechanism executes within or in association with a particular identity provider (IdP), although this is not a limitation, as the technique for associating an identity attribute confidence score may be implemented "as-a-service."

As depicted, preferably the mechanism 600 is implemented as a confidence scoring engine f(a) that receives a set of input criteria to be used to compute a confidence score for an attribute "a." These inputs include, for example, a "last known" value 602 for the attribute; the IdI provides this value, typically together with a date-time stamp when this value was recorded. A second input 604 is one or more documented qualified attribute verification event(s) that, as will be described, ascertain the original value of the attribute and the date-time stamp of these events. As also depicted, the confidence scoring engine 600 may also receive historical statistical data 606 for an attribute, data derived from one or more plugged-in algorithm(s), and customer-specific life events, such as marriage, divorce, etc., perhaps as received from previous use of IdIs by this customer. Other factual or derived information 608 about the customer, IDI or SP may also be considered. According to an aspect of this disclosure, which is described below in more detail, preferably information about the IdI and SP is pre-captured by profiling these entities in advance. The profiling may include both positive and negative information. An example of negative information would be the laxity of attribute validation by an IdI in response to some investigation, information about hackers gaining access to the IdI and changing attribute data, and so forth.

An example of one f(a) function to compute the overall confidence score 610 for an attribute may be as set forth by the following equation:

$$C_{attr} = P_{attr} * \prod_{i=1}^{n} (1 - A_i)$$

where $P_{attr}$ represents a current confidence score for an attribute (attr) after factoring in a "deterioration" confidence, which is a confidence that preferably is based on the attribute's change frequency in historical statistical data, and the information regarding qualified verification events on that attribute. A probability value A represents one or more adverse event(s) either that raises a doubt on the process(es) followed at the identity issuer, the sanctity of the identity issuer's data, or the like. If $A_i$ is the probability of the "$i^{th}$" adverse event, the value $(1-A_i)$ is the probability of the adverse event not impacting the overall confidence score.

The current confidence score $P_{attr}$ is then a time-deteriorated confidence score, represented by $f(C_{attr}, t)$. The function $f()$ computes the current confidence score, e.g., using a formula based on the historical statistical data. In one example implementation as just described, the function takes two parameters, namely, $C_{attr}$ (a confidence score based on the IdI's standing), and "t," which represents either an attribute validation date or a date of attribute registration by the IdI, whichever is latest. In this example embodiment, and as depicted in the above-described formula, the product of the current confidence score, times the product of the probability of every adverse event not impacting the overall confidence score, gives the overall confidence score 610.

While the above-described computation is a preferred technique for computing the time-varying confidence score for an attribute, it is not intended to foreclose other computation(s), e.g., that are based on other available input(s), events, and/or historical data.

Figure 7:
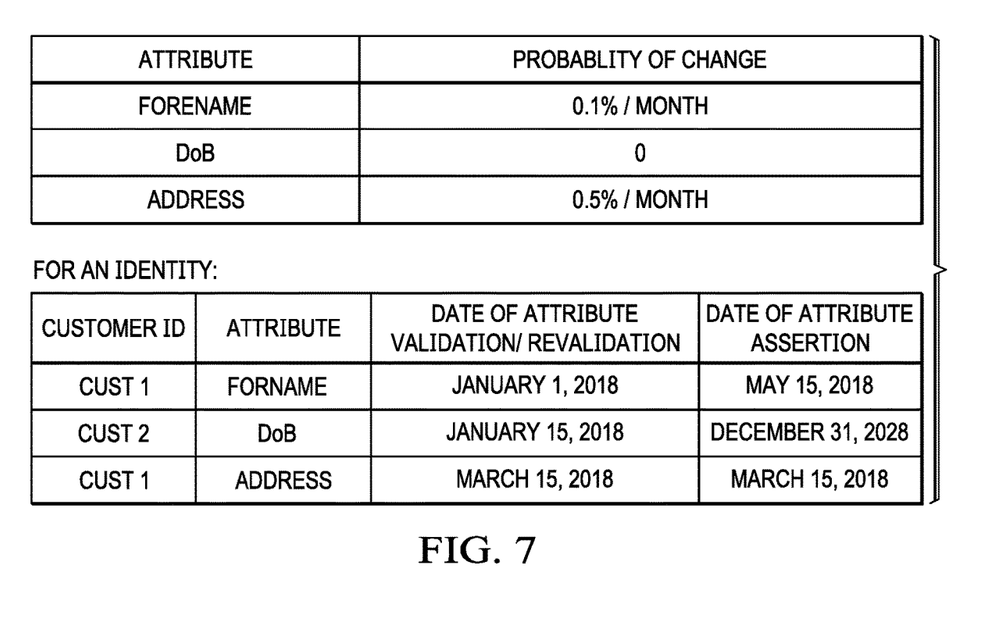
FIG. 7 depicts a set of attribute confidence scores, and a set of identities maintained by an identity provider in an example scenario.

The following explains the above-described approach, continuing with the on-line video rental store example (for descriptive purposes only). In this example, the on-line video rental store SP requests attribute claims for date of birth (DoB) and address (ADDRESS) when a first customer (CUST1) attempts to list available videos for rental. The top portion of FIG. 7 depicts each of a set of attributes, together with corresponding value change probabilities (in accordance with the approach of this disclosure). The bottom portion depicts a set of identities that are being maintained by the IdP. As described above, during the real-time authentication flow, the IdP reaches out to an IdI chosen by the customer. In this example scenario, the chosen IdI returns the values for DoB and ADDRESS from the table shown in FIG. 7, and these values are fed to the confidence computing function f(a) in the IDP. In this simplified example, f(a) takes into consideration only a probability of change parameter, although this is not a limitation, as the computing function may also be based on other external and derived parameters, as previously described. An example of such external parameter may be gender, as in many cultures females change their last name after marriage or divorce.

Figure 8:
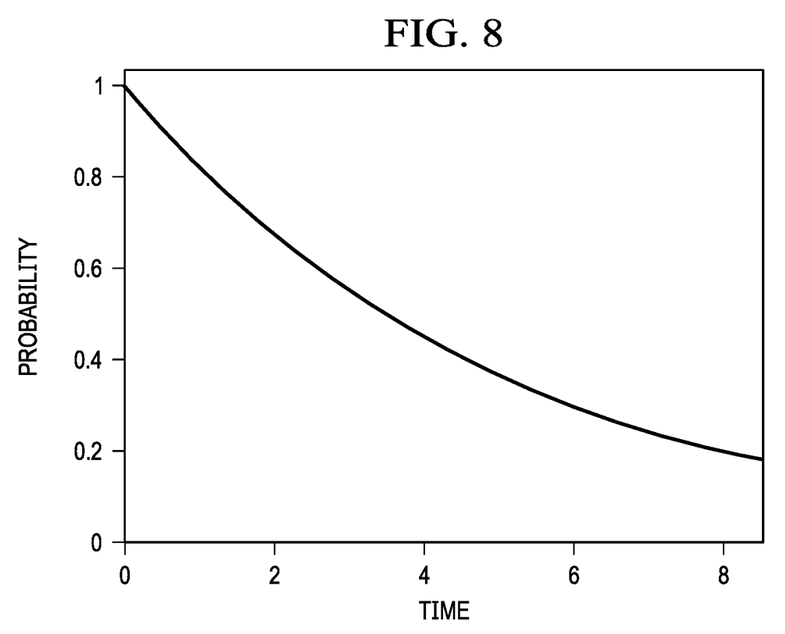
FIG. 8 represents a representative probability of change (deteriorating confidence) graph for an attribute, which plots probability versus time.

FIG. 8 represents a representative probability of change (deteriorating confidence) graph for an attribute, which plots probability versus time. As depicted, the graph is plotted as $e^{-t}$ where t represents time. A more comprehensive deterioration equation preferably is based on historical, statistical data. Nevertheless, the deteriorating confidence graph depicted in FIG. 8 includes the following properties. First, at the time of creating or assigning the identity or identity facet in question, an attribute is likely to be verified. As such, the confidence score at the beginning (the left-most portion) is 100% (namely, the probability of change is 0, and the probability of the attribute value being correct is 1). The deterioration of confidence is a probability of the attribute changing its value over a period of time. The graph depicts a negative exponential, which is merely a representative (and presumably fictitious) mathematical relationship presumably found from statistical data. In this example, the specific attribute's change is such that in two (2) units (month/year/decade) of time, the probability of change is 33.33%; as such, the probability of the attribute retaining its original value in two units of time is only 66.66%. It may continue to deteriorate to an 80% likelihood of a changed value in eight (8) units of time; thus, the probability of the attribute retaining its original value in eight units of time is only 20%.

Figure 9:
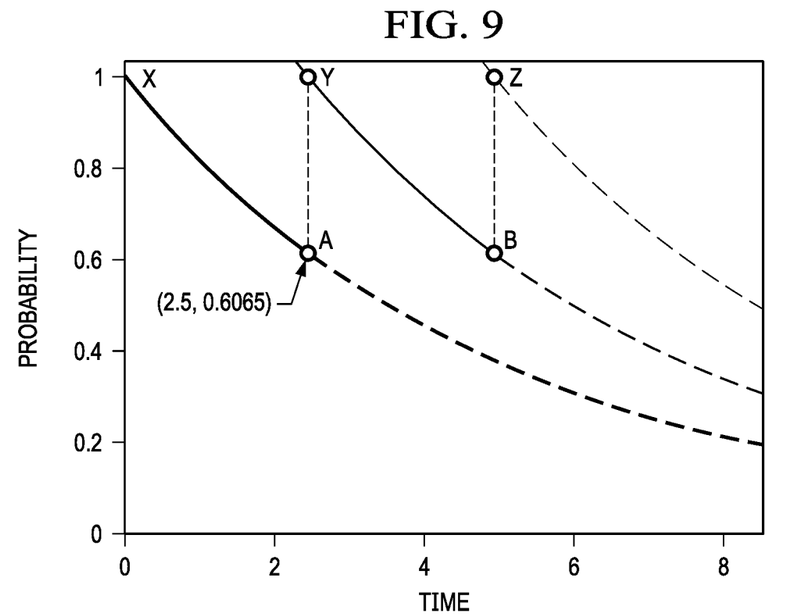
FIG. 9 depicts how a computed confidence score may be reset upon the occurrence of one or more qualified verification events.

As described above, the notion of computing the confidence score typically considers other qualified verification events that, in an illustrative embodiment, arrest the deteriorating curve. FIG. 9 depicts how this operation works for another attribute represented by its deteriorating confidence graph. As shown, an original deteriorating probability curve for the attribute is shown by $x=e^{-t}$. In this example, and at 2.5 units of time, a qualified attribute verification event occurs and, in response, the probability curve is reset to 100%; the new curve is represented by equation $y=e^{-t}$. This resetting (or, more generally, adjustment) of the graph occurs once again, this time at the 5th unit of time, with the curve getting reset to equation $z=e^{-t}$. While the qualified attribute verification event(s) in these examples reset the graph to 100%, this is not a requirement, as a particular event may only cause a partial resetting. In addition, multiple such event(s) may occur together, in which case the nature and extent of the resetting may be varied accordingly, e.g., as a function of the events.

In the authentication flow example described, the customer is assumed to have registered with multiple IdIs and has elected one or more of them to respond to a given SP's authentication request. In this example, and in response to the receiving the SP's authentication request, the IdP contacts the selected IdIs and receives attribute values from each of them, together with a date-time stamp when that attribute's value was registered with the particular IdI. Thus, for example, assume the attribute is address and that the customer has selected his or her passport authority as one IdI, and a utility vendor as another IdI. In this example, assume that the utility vendor's last invoice payment acts as a qualified attribute verification event for the customer's address claim; in such case, if the system determines a match between an address value returned from the passport authority and the value returned from the utility vendor, the qualified attribute verification event is considered to be met and the attribute's deteriorating confidence curve reset, in the manner described.

An IdP may also associate usage of an IdI for a specific attribute and the SP's allowance of that attribute claim, and determine whether a specific threshold of the computed confidence score is met. In such case, the historic analysis of the SP's need for an attribute claim, together with the SP's threshold for accepting an attribute's confidence score, act as a pseudo-verification event for a customer's attribute claim for that SP, typically with respect to a specific date in the past.

IdI Profiling

Figure 10:
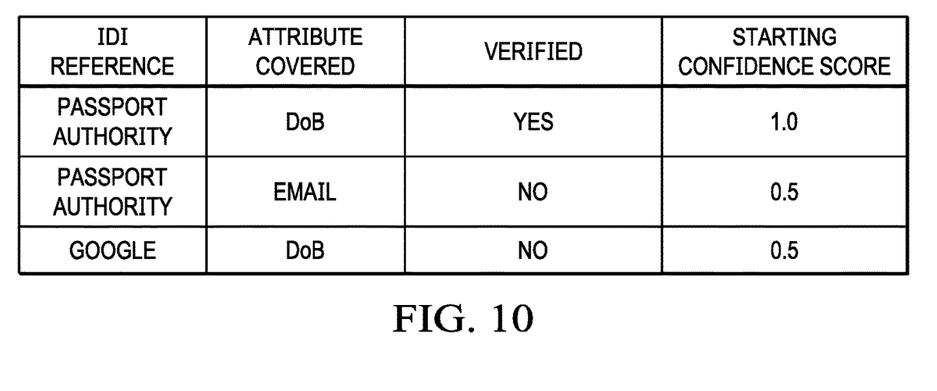
FIG. 10 depicts an example IdI profile.

The above example scenario assumes that the attribute values supplied by an IdI have been vetted by the IdI at the time of identity creation or assignment. This is not required, however. As previously described, one IdI may verify an attribute (e.g., DoB), whereas another may verify only an email address. Thus, preferably the IdIs are profiled by the IdP to facilitate a starting confidence score for an attribute. FIG. 10 depicts a table showing the results of profiling several IdI with respect to the identified attributes. As shown, the passport authority IdI has verified the DoB attribute, but not the email address attribute, and thus the profile reflects a higher starting confidence score.

SP Profiling

In addition to profiling IdIs, a service provider (SP) may be profiled. As noted above, and as part of a verified claim in an authentication token, preferably the system generates a confidence score for a customer and attribute value from a chosen IdI. Based on the behavior of multiple such customers, preferably the system also determines a SP threshold for a confidence score on each attribute from a specific IdI. Thus, as example of SP profiling, if the same or multiple customers chose a particular IdI reference for a specific attribute, when that attribute's confidence score is deteriorating over time, this may indicate that the SP is ignoring the confidence score (e.g., because the SP still trusts an IdI), or that a threshold for this SP's allowance of the confidence score has not yet been found by the IdP. As another example, when the same customer chooses more than one IdI in the same transaction (or in two nearly subsequent transactions) for the same attribute claim, the system can determine a threshold for this SP's confidence score for the attribute. This threshold can then be saved in (or as) the SP profile.

Figure 11:
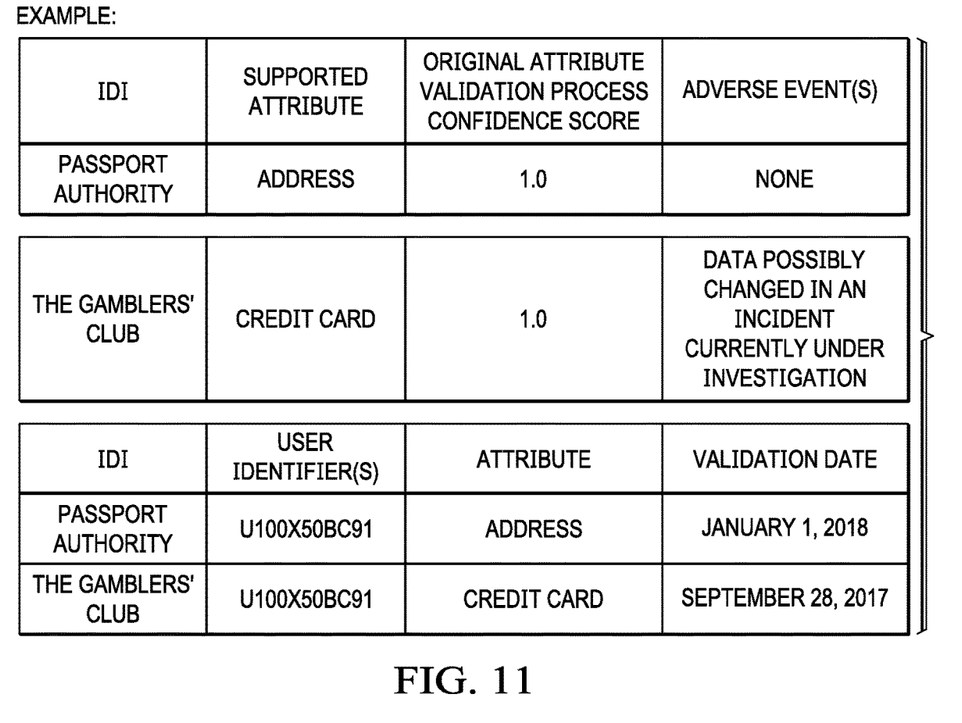
FIG. 11 depicts how the IdP derives a confidence deterioration equation.

FIG. 11 depicts how IdI profiling can be implemented. In this example, there are two (2) distinct data sets: the first data set (the top one) depicts an IdI confidence scoring per attribute for the identified IdIs after IdI profiling. As shown, the first data set depicts two (2) IdIs, namely passport authority, and a (fictitious) gambler's club. After profiling is performed, the system determines that both IdIs carry out comprehensive checks of the user's specific attributes (in this case, address and credit card information). In this example scenario, a highest confidence score (1.0) is assigned to the passport authority and the club for checking the address and credit card respectively. The second data (the bottom one) depicts information for these IdIs, but with respect to an individual, identified by the identifier U100X50BC91, whose address and credit card were verified by the passport authority and the club on Jan. 1, 2018, and Sep. 28, 2017, respectively. Assume now that this individual, U100X50BC91, has a need to purchase a mobile device SIM card for upcoming travel on Apr. 1, 2018. He or she has located a service provider (an e-commerce website) that offers unlimited data and voice at a good price. The service provider, however, requires two verified attributes from its prospective customer, namely, address (so that the SIM card can be delivered), and credit card (so that the payment is assured to be authentic and guaranteed). Further, assume that the website offers customers two possible avenues to provide these verified attributes: advance registration, or using an IdP that has a trust relationship with the service provider. IdP provides a service of authenticating customers on SP' s behalf, and it also provides a confidence score for every attribute based on the identity source (IdI) the customer chooses, all in the manner described herein. Finally, assume that the individual, U100X50BC91, has an account with the IdP and elects to use it for authentication; the individual then provides the two verified attributes to the service provider, e.g., via a secure markup language page. As part of this authentication transaction with the SP, the individual uses the passport authority and club IdIs for proving to the SP his address and credit card information. As described herein, preferably the IdP then carries out the following operations.

Figure 12:
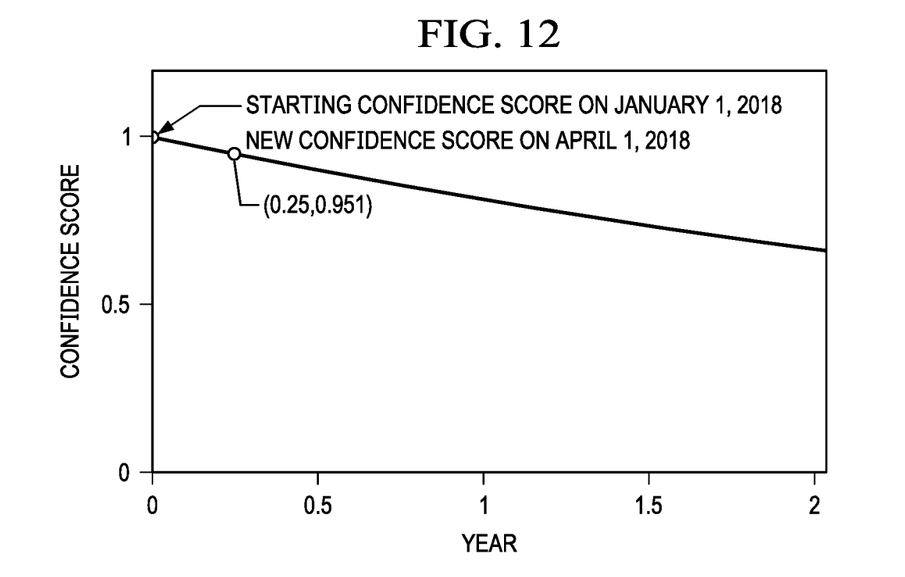
FIG. 12 depicts a plot of the confidence deterioration equation.

First, the IdP derives a confidence deterioration equation, e.g, from historical statistical data for the two (2) attributes in question. In this example, it has been determined that the frequency with which the attribute "address" changes for citizens in a given demographic is $C_{attr}=e^{-0.2t}$. The "t" represents the time when the confidence score for "address" is to be measured, in this case Apr. 1, 2018. FIG. 12 depicts the plot of this equation. For $P_{address}=f(C_{address},t)$, the score evaluates as $P_{address}=f(1.0, Apr 1, 2018)=0.951$. In this example, and because no adverse events to indicate any doubt regarding a data compromise are indicated in first table (FIG. 11), the confidence score for the address attribute is then computed as follows: $C_{address}=P_{address}*(1-A_i)$, or $C_{address}=0.951*(1-0)=0.951$.

Credit card information, however, is assumed not (based on historical statistical data in this example) to be deteriorating over time. For $P_{cc}=f(C_{cc}, t)$, the score evaluates as $P_{cc}=f(1.0, Sep. 28, 2017)=1.0$. Here, and as depicted in the first data set, at least one adverse event was recorded on the club. Because (as indicated in the first data set) the investigation is still continuing, the IdP cannot know the damage for sure; it is possible that the data may not have been stolen or otherwise tampered with. To err on the side of caution, however, the system takes the likelihood of this adverse event to have impacted the data to be 50%. Thus, the confidence score for credit card information is then computed as follows: $C_{cc}=P_{cc}*(1-A_i)$, or $C_{cc}=1.0*(1-0.5)=0.5$.

Figure 13:
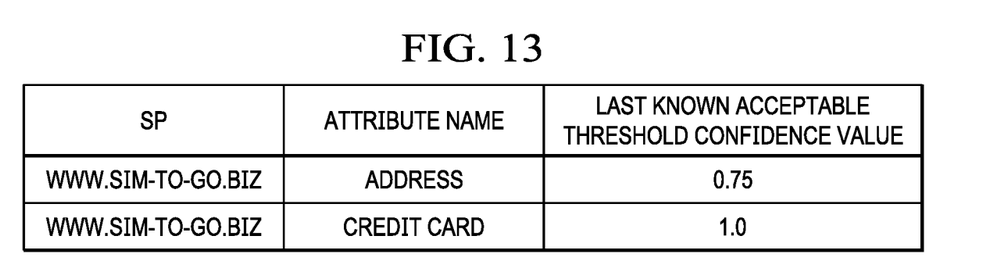
FIG. 13 depicts a representative SP profile.

The IdP then includes these computed confidence scores with the assertion that it returns to the service provider. Over a period of time, the IdP (the system) tracks and thus learns the usage and behavior patterns of the customers choosing IdIs for asserting specific attribute claims to the service provider. The system learns how the service provider treats the confidence score(s) for each specific attribute from the respective IdI(s). Based on this information, the IdP can suggest to the customer which IdI to choose for a specific attribute claim for the SP. Continuing with the above example, and with reference to FIG. 13, assume that the IdP has operated in this manner and collected the profile depicted for this service provider and the two (2) attributes in question. In this example, when the user attempted to purchase the SIM card from the service provider website, assume he or she chose the club IdI to ascertain his credit card, and the passport authority IdI to ascertain his address. Because, however, the IdP's computed confidence score for these attributes was 0.5 and 0.951 respectively, the IdP responds to these scores by asking the user to select some other IdI to ascertain the validity of the credit card attribute (because of the low confidence score computed on the club). In this manner, the user's purchase request on the service provider site is not rejected, thereby avoiding unnecessary time and effort for both the vendor and the user.

The techniques herein provide significant advantages. The approach herein enables more useful and efficient attribute-based authentication and authorization, thereby providing more fine-grained access control as compared to password and token-based authentication schemes commonly used in the art. The techniques herein, which provide for time-diminishing attribute values and the use of qualifying events to impact confidence scoring, enable a system to provide more effective confidence scoring, thereby enhancing the operation of the attribute-based authentication and authorization. Further, prior art techniques do not differentiate between or among identity providers and thus neglect the possibility of a rogue identity provider skewing confidence scores, with or without collusion with a user. The approach described herein addresses this possibility by profiling the identity providers and then tracking how those providers operate. Attribute values that are not kept updated may cause the time decay to lower a confidence score for that attribute value. The approach herein also advantageously profiles service provider confidence score thresholds to recommend which identity source's attributes to use. The profiling of service provider minimum threshold confidence scoring requirements for offered services provides insights into recommending to a user a specific identity source. This minimizes the amount of data interaction between the user and the service provider needed to gain access to desired services.

The approach herein leverages the notion deteriorating confidence scores, as well as the notion of dynamicallycomputing a confidence score, as deterioration (and the possible arresting thereof by qualifying events) provides for time-varying attribute values and thus more fine-granted attribute-based access control. The approach also enables computation of a minimum threshold confidence score that a service provider may mandate to gain access to a service.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. In particular, the IdP or any of the workflow functions described may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the administrator configurator and the suspension workflow components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, any authentication or authorization functionality required herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The techniques herein provide for improvements to another technology or technical field, namely, attribute-based authentication and authorization systems, identity access and management systems, as well as improvements to the functioning of identity providers within such systems.

Further, while the notion of a confidence score deteriorating over time is the usual situation, the "time-varying" nature of a confidence score may also extend to scenarios where the confidence measure improves over time, and this improvement may occur irrespective of a reset initiated by a qualified attribute verification event.

There is no requirement that any particular technique be used to obtain historical data for an attribute's change frequency. The source of that information may vary depending on the attribute. Thus, for example, a person's name change often involves a legal proceeding, and thus statistical mining (for name changes) of various databases (e.g., an SSN database, or a Court affidavit database, etc.) enables the system to identify a rate of change per person per some configurable time period. For other attributes, such as address change, the system may mine relevant data sources (e.g., a Post Office change of address request database) for such information. Still other potential data sources include, without limitation, voter registration databases, DMV databases, etc. Regardless of the data source, typically the rate of deterioration for an attribute is derived from this data mining.

Having described our invention, what we claim is as follows:

1. A method to authorize a request to access a protected resource, the request being received from a service provider and being associated with a requesting entity having one or more associated identity issuers, comprising:

receiving from at least one identity issuer an identity attribute for the requesting entity;

computing a time-varying confidence score based in part on the attribute's change frequency as reflected in historical data; and     upon validating the requesting entity, generating and returning to the service provider a security assertion that includes the identity attribute and the time-varying confidence score.

2. The method as described in claim 1 wherein the time-varying confidence score is a time-deteriorated confidence measure having a value that diminishes over a time period.

3. The method as described in claim 2 wherein a beginning of the time period is one of: a validation date for the attribute, and a date of attribute registration by the at least one identity issuer.

4. The method as described in claim 2 wherein the time-deteriorated confidence measure is also based on a probability of an adverse event associated with the at least one identity issuer.

5. The method as described in claim 4 wherein the time-deteriorated conference measure is reset to an initial measure upon verifying the adverse event.

6. The method as described in claim 1 further including generating a profile for the service provider, the profile including a minimum threshold for the attribute's confidence score.

7. The method as described in claim 6 further including providing a recommendation to use a different identity issuer, wherein the recommendation is based on information in the profile.

8. An apparatus, comprising:

a processor;

computer memory holding computer program instructions executed by the processor to authorize a request to access a protected resource, the request being received from a service provider and being associated with a requesting entity having one or more associated identity issuers, the computer program instructions comprising program code configured to:

receive from at least one identity issuer an identity attribute for the requesting entity;

compute a time-varying confidence score based in part on the attribute's change frequency as reflected in historical data;

upon validating the requesting entity, generate and return to the service provider a security assertion that includes the identity attribute and the time-varying confidence score.

9. The apparatus as described in claim 8 wherein the time-varying confidence score is a time-deteriorated confidence measure having a value that diminishes over a time period.

10. The apparatus as described in claim 9 wherein a beginning of the time period is one of: a validation date for the attribute, and a date of attribute registration by the at least one identity issuer.

11. The apparatus as described in claim 9 wherein the time- deteriorated confidence measure is also based on a probability of an adverse event associated with the at least one identity issuer.

12. The apparatus as described in claim 11 wherein the program code is further configured to reset the time-deteriorated conference measure to an initial measure upon verifying the adverse event.

13. The apparatus as described in claim 8 wherein the program code is further configured to generate a profile for the service provider, the profile including a minimum threshold for the attribute's confidence score.

14. The apparatus as described in claim 13 wherein the program code is further configured to provide a recommendation to use a different identity issuer, wherein the recommendation is based on information in the profile.

15. A computer program product in a non-transitory computer readable medium for use in a data processing system, the computer program product holding computer program instructions which, when executed by the data processing system, to authorize a request to access a protected resource, the request being received from a service provider and being associated with a requesting entity having one or more associated identity issuers, the computer program instructions comprising program code configured to:

receive from at least one identity issuer an identity attribute for the requesting entity;

compute a time-varying confidence score based in part on the attribute's change frequency as reflected in historical data; and     upon validating the requesting entity, generate and return to the service provider a security assertion that includes the identity attribute and the time-varying confidence score.

16. The computer program product as described in claim 15 wherein the time-varying confidence score is a time-deteriorated confidence measure having a value that diminishes over a time period.

17. The computer program product as described in claim 16 wherein a beginning of the time period is one of: a validation date for the attribute, and a date of attribute registration by the at least one identity issuer.

18. The computer program product as described in claim 16 wherein the time-deteriorated confidence measure is also based on a probability of an adverse event associated with the at least one identity issuer.

19. The computer program product as described in claim 18 wherein the program code is further configured to reset the time-deteriorated conference measure to an initial measure upon verifying the adverse event.

20. The computer program product as described in claim 15 wherein the program code is further configured to generate a profile for the service provider, the profile including a minimum threshold for the attribute's confidence score.

21. The computer program product as described in claim 20 wherein the program code is further configured to provide a recommendation to use a different identity issuer, wherein the recommendation is based on information in the profile.

\* \* \* \* \*